(12) United States Patent
Dickerman et al.

(10) Patent No.: US 10,102,243 B2
(45) Date of Patent: *Oct. 16, 2018

(54) SPECIFICATION OF DATABASE TABLE RELATIONSHIPS FOR CALCULATION

(71) Applicant: Microsoft Technology Licensing, LLC, Redmond, WA (US)

(72) Inventors: Howard Dickerman, Bellevue, WA (US); Vjacheslav Min, Redmond, WA (US); Marius Dumitru, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,124

(22) Filed: Apr. 20, 2016

(65) Prior Publication Data

US 2016/0232203 A1    Aug. 11, 2016

Related U.S. Application Data

(63) Continuation of application No. 13/162,538, filed on Jun. 16, 2011, now Pat. No. 9,348,941.

(51) Int. Cl.
*G06F 17/30* (2006.01)

(52) U.S. Cl.
CPC .... *G06F 17/30421* (2013.01); *G06F 17/3056* (2013.01); *G06F 17/30595* (2013.01); *G06F 17/30955* (2013.01)

(58) Field of Classification Search
None
See application file for complete search history.

(56) References Cited

U.S. PATENT DOCUMENTS

| | | | |
|---|---|---|---|
| 5,535,382 A * | 7/1996 | Ogawa | G06F 17/30687 |
| 5,548,749 A | 8/1996 | Kroenke et al. | |
| 5,584,024 A | 12/1996 | Shwartz | |
| 7,571,192 B2 | 8/2009 | Gupta et al. | |
| 2004/0093331 A1 | 5/2004 | Gamer et al. | |
| 2005/0179684 A1 | 8/2005 | Wallace | |
| 2006/0075328 A1 | 4/2006 | Becker et al. | |
| 2006/0235834 A1 | 10/2006 | Blakeley et al. | |
| 2007/0016596 A1 * | 1/2007 | Fabret | G06F 17/30566 |
| 2007/0094302 A1 | 4/2007 | Williamson et al. | |
| 2010/0293163 A1 | 11/2010 | McLachlan et al. | |

(Continued)

OTHER PUBLICATIONS

"Final Office Action Issued in U.S. Appl. No. 13/162,538", dated May 6, 2015, 13 Pages.

(Continued)

*Primary Examiner* — Belix M Ortiz Ditren

(57) ABSTRACT

A relationship amongst multiple relationships between database tables can be specified independent of a query. More specifically, a function (USERELATIONSHIP) can be introduced to the DAX language (Data Analysis Expressions), which provides a way to author formulas that are not evaluated immediately, but that can be evaluated dynamically and concurrently in many different contexts. The function enables a single relationship to be specified in the calculation formula away from the query. This provides a mechanism within the formula that specifies specific relationship(s) that are to be followed when the dynamic expression is evaluated.

20 Claims, 7 Drawing Sheets

(56) References Cited

U.S. PATENT DOCUMENTS

2010/0293169 A1* 11/2010 Takata .............. G06F 17/30864
707/749
2011/0087954 A1 4/2011 Dickerman et al.
2014/0075408 A1* 3/2014 Korat ................... G06F 9/4436
717/104

OTHER PUBLICATIONS

"Non-Final Office Action Issued in U.S. Appl. No. 13/162,538", dated Aug. 13, 2012, 8 Pages.
"Non-Final Office Action Issued in U.S. Appl. No. 13/162,538", dated Jul. 18, 2013, 16 Pages.
"Non-Final Office Action Issued in U.S. Appl. No. 13/162,538", dated Jul. 11, 2014, 12 Pages.
"Notice of Allowance Issued in U.S. Appl. No. 13/162,538", dated Jan. 20, 2016, 9 Pages.

* cited by examiner

SPECIFICATION OF DATABASE TABLE RELATIONSHIPS FOR CALCULATION

CROSS-REFERENCE TO RELATED APPLICATION

This application is a continuation of U.S. application Ser. No. 13/162,538 filed Jun. 16, 2011, the entirety of which is incorporated herein by reference.

BACKGROUND

Databases are used often for many different purposes, the least of which is to store vast amounts of data, and then provide some capability to mine the data, and view the results. Multi-dimensional data analysis, which provides the capability to view and analyze data from multiple perspectives, has become increasingly popular with businesses. However, current multi-dimensional data analysis applications typically require users to be proficient in complex semantic languages, which then is difficult for untrained business employees.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to specification of relationships defined between tables in a database for calculation. More specifically, a relationship can be specified in a calculation formula in a way that abstracts it from queries that independently invoke the calculation. In accordance with one embodiment, a function (USERELATIONSHIP) is introduced to the DAX (Data Analysis Expressions) language, which provides a way to author formulas that are not evaluated immediately, but that are evaluated dynamically and concurrently in many different contexts. The function enables a single relationship to be specified in the calculation formula away from the query. This provides a mechanism within the formula that specifies specific relationship(s) that are to be followed when the dynamic expression is evaluated.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward handling multiple table relationships in database systems by way of an expression language. Traditionally, the choice of relationships was routinely specified as part of the query syntax at the time the query was being executed. The description herein discloses the capability to specify a relationship independently of a query, and provide the relationship selections independently from the formula. Additionally, the relationship path(s) followed can be specified as part of defining the formula for the calculation.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
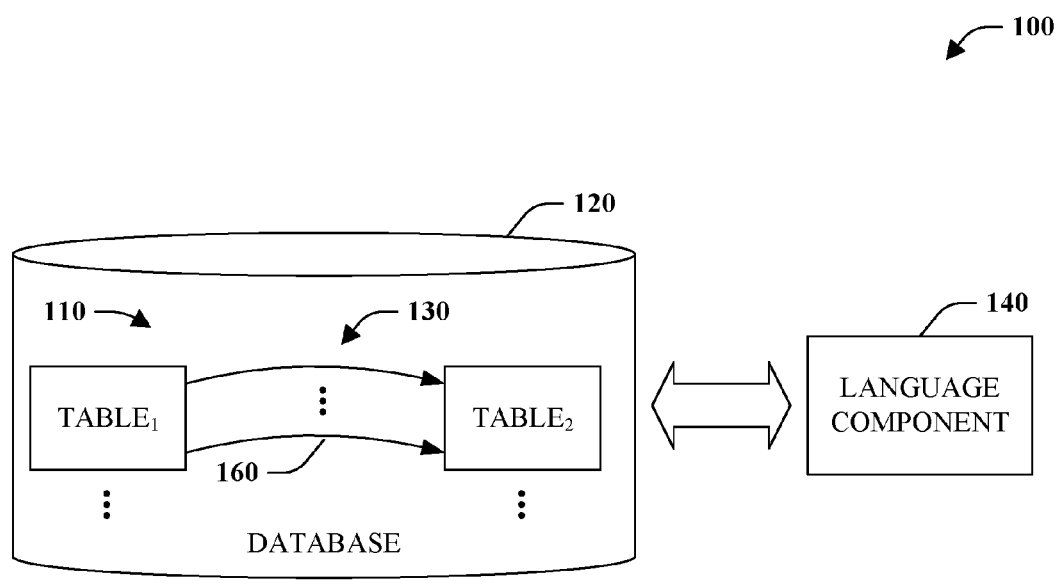
FIG. 1 is a system that facilitates relationship selection in multi-relationship tables.

Referring initially to FIG. 1, a system 100 is illustrated that facilitates relationship selection in multi-relationship tables. The system 100 includes at least two tables 110 of a database 120. The at least two tables 110 have multiple relationships 130 defined therebetween. The system 100 can also include a language component 140 that specifies a relationship 160 of the multiple relationships 130 to follow for a calculation.

The language component 140 can be employed in a formula that when evaluated performs the calculation on table items associated with the relationship 160. The language component 140 enables selection of the relationship 160 as part of the formula, but independent of the query. The language component 140 includes arguments that represent the endpoints of the relationship, which are columns in the tables. In one example, the arguments can be a column name of a many-side of the relationship and a column name of a lookup side of the relationship 160. However, this is not to be construed as limiting, since any type of relationship between a pair of tables can be handled. The language component 140 can be embodied as an analysis function (the USERELATIONSHIP) that overrides database settings of the relationship 160 and enables the relationship 160 only for duration of the calculation. Additionally, the relationships 130 can be assigned weighted priorities and an ambiguity resolved based on the weighted priorities.

Given a pair of tables, "T1" and "T2:" when there are zero or one relationships between "T1" and "T2," there is no ambiguity and no problem to solve. However, when there are two or more relationships between tables "T1" and "T2," there is ambiguity that can be addressed. Still further, when there are more than two paths from "T1" to "T2," there is ambiguity to be addressed. For example, when "T1" is related to "T3," "T3" is related to "T2," and "T1" is related to "T2" directly. This would create two paths from "T1" to "T2"—one of the paths is a direct path, the other path is indirect by way of "T3."

Any relationship in the database may be active or inactive. An active relationship is followed, by default, and an inactive relationship is not followed by default.

One purpose of the USERELATIONSHIP function is to override the database settings regarding which relationships are active or inactive, effectively specifying the set of relationships to be followed for a specific calculation. In other words, the behavior of following active relationships by default can be overridden. This effectively specifies the relationships to be followed rather than observing the rule of following the active relationship. It can also be the case to specify the active relationship as well, to force that relationship to be followed, even if it is subsequently changed to inactive.

The USERELATIONSHIP function specifies the relationship(s) to be used within a specific calculation. This specification lasts only for the duration of that calculation, and does not impact the database schema in any permanent way. When the specific calculation is completed, everything returns to the previous state, with some relationships being active and others being inactive. The USERELATIONSHIP function cannot be used to make relationships active or inactive permanently.

Given a pair of tables, "T1" and "T2," with three relationships between them, "R1," "R2," and "R3:" USERELATIONSHIP is not concerned with which of the relationships is active or inactive. If USERELATIONSHIP specifies that one of the relationships is to be used, thus implying that the other relationships are not to be used. If USERELATIONSHIP specifies that two of the relationships are to be used, this implies that the third relationship is not to be used. The USERELATIONSHIP function may specify that one or more of the relationships is to be used, and this implies that all other relationships between those tables are not to be used.

With respect to ambiguous paths, where each pair of tables has only one relationship, and given more than two tables with arbitrary shapes in the schema, this can present a different problem. Consider a diamond shaped schema: the table "Transactions" has a many-to-one relationship to the table "BillToCustomers", the table "Transactions" has a many-to-one relationship to the table "ShipToCustomers", the table "BillToCustomers" has a many-to-one relationship to the table "Region", and the table "ShipToCustomers" has a many-to-one relationship to the table "Region".

In existing implementations, it may not be possible to have this schema where all four relationships are active, but this schema can exist where one of the relationships is inactive. When a calculation invokes USERELATIONSHIP on the inactive relationship, it creates a scenario where there are ambiguous paths and where it may not be clear as to how cross-filtering is to be applied.

The USERELATIONSHIP function provides a mechanism where the user-selected path will be followed even though there is a potential for ambiguity.

With respect to nested invocations of USERELATIONSHIP, there can be multiple nested invocations of USERELATIONSHIP when there are nested invocations of CALCULATE. In such scenarios, this may cause ambiguity in the path to be followed. Accordingly, USERELATIONSHIP favors the path that is specified in the innermost invocation, thereby following the selected relationship even though there is a potential for ambiguity.

Figure 2:
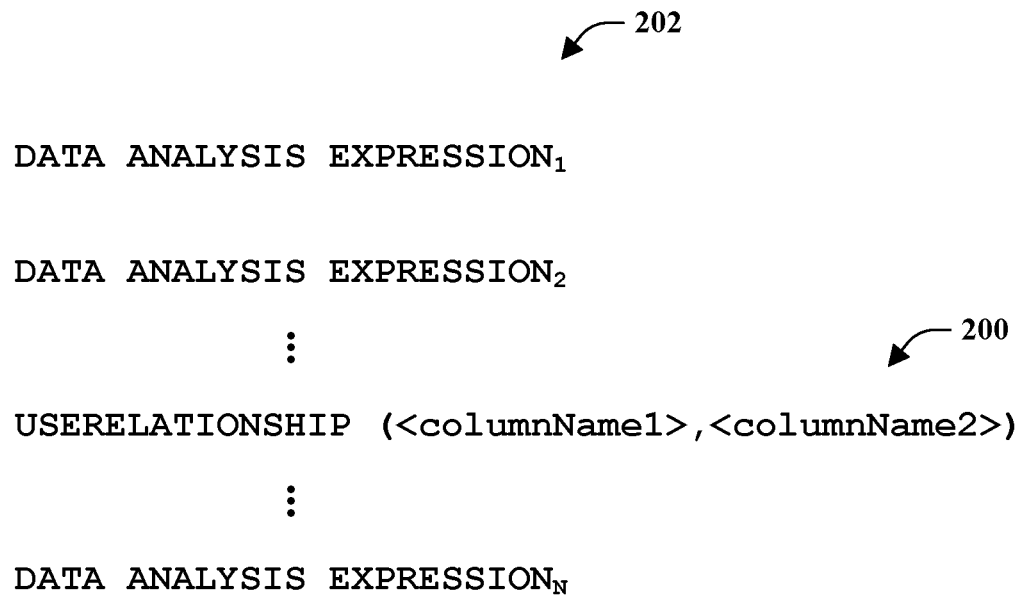
FIG. 2 is an exemplary language component as part of an analysis language of data analysis expressions.

Turning attention to FIG. 2, an exemplary language component 200 is illustrated as part of an analysis language of data analysis expressions 202. The depicted format is one exemplary usage of the language expression function. The language component is now described in terms of the DAX language.

The DAX formula language provides a way to author formulas that are not evaluated immediately, but that are evaluated dynamically in many different contexts at once. By adding the USERELATIONSHIP function to the DAX language, a mechanism is provided to the formula that specifies specific relationship(s) that are to be followed when the dynamic expression is evaluated. As previously indicated, the capability is provided to separate the relationship selection from any query against the database that might invoke the calculation, thereby providing the relationship selections independently from the formula. Additionally, the capability is provided to specify the relationship path(s) to be followed as part of defining the formula for the calculation.

The USERELATIONSHIP Function (DAX) specifies the relationship to be used in a specific calculation. Parameters for the function can be as follows:

columnName1: The name of an existing column, using standard DAX syntax and fully qualified, that usually represents the many side of the relationship to be used; if the arguments are given in reverse order the function can swap the arguments before using the arguments.

columnName2: The name of an existing column, using standard DAX syntax and fully qualified, that usually represents the one side or lookup side of the relationship to be used; if the arguments are given in reverse order the function will swap the arguments before using the arguments. This argument cannot be an expression. (Note that although the parameters are defined for utilization in a many-to-one implementation, other types of relationships such as one-to-one can be implemented.)

The function returns no value; the function solely enables the indicated relationship for the duration of the calculation.

The USERELATIONSHIP function can be used in functions that take a filter as an argument, for example: CALCULATE, CALCULATETABLE, CLOSINGBALANCEMONTH, CLOSINGBALANCEQUARTER, CLOSINGBALANCEYEAR, OPENINGBALANCEMONTH, OPENINGBALANCEQUARTER, OPENINGBALANCEYEAR, TOTALMTD, TOTALQTD and TOTALYTD functions.

The USERELATIONSHIP function uses existing relationships in the model, identifying relationships by associated ending point columns.

In USERELATIONSHIP, the status of a relationship as active or not does not affect the usage of the function. Even if the relationship is inactive, the relationship can be used and overrides any other active relationships that may be present in the model, but not mentioned in the function arguments.

An error can be returned if any of the columns named as an argument is not part of a relationship or the arguments belong to different relationships.

If multiple relationships are utilized to join table A to table B in a calculation, each relationship can be indicated in a different USERELATIONSHIP function.

If CALCULATE expressions are nested, and more than one CALCULATE expression contains a USERELATIONSHIP function, then the innermost USERELATIONSHIP is the function that prevails in case of a conflict or ambiguity.

In one implementation, up to ten USERELATIONSHIP functions can be nested; however, an expression may have a deeper level of nesting. The following example expression is nested three levels deep, but only two levels for USERELATIONSHIP:

```
=CALCULATE(CALCULATE( CALCULATE( <anyExpression>,
    USERELATIONSHIP( t1[colA], t2[colB])), t99[colZ]=999),
    USERELATIONSHIP( t1[colA], t2[colA])).
```

The following example shows how to override the default active relationship between InternetSales and DateTime tables. The default relationship exists between the OrderDate column in the InternetSales table, and the Date column in the DateTime table.

To calculate the sum of Internet sales and allow slicing by ShippingDate instead of the traditional OrderDate, a measure [InternetSales by ShippingDate] can be created using the following expression:

```
=CALCULATE(SUM(InternetSales[SalesAmount]),
USERELATIONSHIP(InternetSales[ShippingDate], DateTime[Date]))
```

The result shows Internet Sales sliced by shipping date rather than by order date as is usually shown in these examples. For this example to work, there must be an existing relationship between "InternetSales[ShipmentDate]" and "DateTime[Date]". Additionally, there should be an active relationship between "InternetSales[OrderDate]" and "DateTime[Date]."

Note that specifying the relationship works whether the relationship specified is active or inactive. In other words, one formula can be written to get the sum of orders and another formula written to get the sum of shipments, without concern for which one was active and which was inactive. The USERELATIONSHIP function forces the correct calculation as long as the relationship exists. In an alternative embodiment, the relationship can be created on the fly, if it did not previously exist.

Following are descriptions of use cases. In a first case, "Sales" and "Customer" are related by "BillTo" and "ShipTo." The Customer table includes a column named "CustID," and the Sales table includes two columns: "BillTo CustID" and "ShipTo CustID." The "Sales" columns participate in relationships to "Customer [CustID]."

Following are two measures: "Invoice Sales" shows the amount sold using filters from the "BillTo" customer, and "Shipment Sales" shows the amount sold using filters from the "ShipTo" customer.

As an example as to how these may be different, consider the following scenario: $5,000 dollars of goods is sold to Sears Roebuck, billed to their corporate office in Chicago, but shipped to their store in Seattle. A PivotTable report is generated that lists states down the left side, and shows both of these measures. It is desired that the $5,000 transaction appear alongside Illinois in "Invoice Sales" and alongside Washington in "Shipment Sales."

Following are the formulas, using the USERELATIONSHIP function:

```
[Invoice Sales]
    = CALCULATE (SUM (Sales[Amount]), USERELATIONSHIP
(Sales [BillTo CustID], Customer [CustID]))
```

```
[Shipment Sales]
    = CALCULATE (SUM (Sales[Amount]), USERELATIONSHIP
(Sales [ShipTo CustID], Customer [CustID]))
```

In a second use case, "Sales" and "Time" tables are related by "Order Date" and "Ship Date." The "Sales" table includes a column named "Order Date" and a column named "Ship Date." Both of these columns have a relationship to the "Time [Date]" column. It is desired to use different relationships when evaluating measures for "Qty Ordered" and "Qty Shipped."

Following are the formulas, using the USERELATIONSHIP function:

```
[Qty Ordered]
    = CALCULATE (SUM (Sales[Qty]), USERELATIONSHIP
(Sales [Order Date], Time [Date]))
[Qty Shipped]
    = CALCULATE (SUM (Sales[Qty]), USERELATIONSHIP
(Sales [Ship Date], Time [Date]))
```

Figure 3:
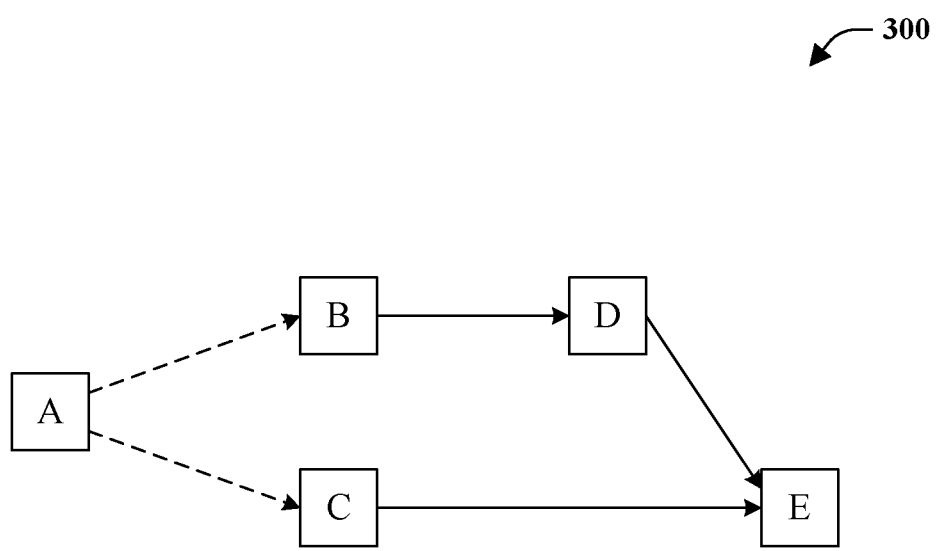
FIG. 3 is a third use case for an arbitrary schema with nested invocations.

Turning now to FIG. 3, a third use case is illustrated for an arbitrary schema with nested invocations. Consider the following schema: where table "A" has a many-to-one relationship to table "B," the table "A" has a many-to-one relationship to table "C," the table "B" has a many-to-one relationship to table "D," the table "D" has a many-to-one relationship to table "E," and the table "C" has a many-to-one relationship to the table "E." The solid line relationships are active and the dotted line relationships are inactive.

A measure can be defined based on some arbitrary expression as follows:

```
A [M1] = CALCULATE (CALCULATE (<expression>,
    USERELATIONSHIP(A[FK], B[PK])),
    USERELATIONSHIP(A[FK],C[PK]))
``` where A[FK] specifies the column used as the relationship's "foreign key" and B[PK] is the column used as the relationship's "primary key". (These terms "foreign key" and "primary key" are commonly used terms to describe the endpoints of a many-to-one relationship.)

A PivotTable report can be built where a column from Table "E" is on Rows, and the measure "M1" is on values. This measure starts by activating the relationship "A→C," then evaluates the inner CALCULATE, which then starts by activating the relationship "A→B." Then, the measure will evaluate the expression, and because "A→B" was specified innermost, the "A→B" relationship wins out, and the expression is sliced, following the path from "A" to "B" to "D" to "E."

As indicated previously, the USERELATIONSHIP function can be used to provide a way of handling scenarios where a single pair of tables has more than one relationship between the tables. For example, following are two scenarios for which this function is a solution:

Two tables: Sales and Customer. The "Sales" table has both a "BillToCustID" and also a "ShipToCustID," and each of these is related to "Customer." It is desired to specify the relationship to use in any given calculation.

Three tables: Bugs and People and Time. The "Bugs" table has four columns that are related to "People," namely: "AssignedTo," "CreatedBy," "ResolvedBy," and "ClosedBy." The "Bugs" table has three columns that are related to "Time," namely: "CreatedDate," "ResolvedDate," "ClosedDate."

Figure 4:
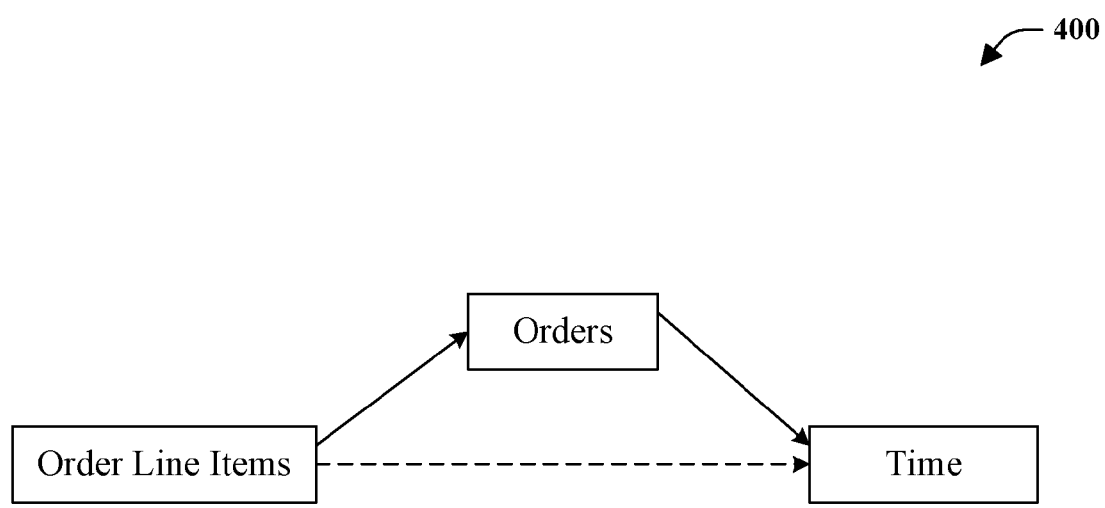
FIG. 4 illustrates an example where there can be ambiguous paths without multiple paths between a pair of tables.

FIG. 4 illustrates an example 400 where there can be ambiguous paths without multiple paths between a pair of tables. For example, consider the following. An "Orders" table is related to a "Time" table based on an order date column, an "Order Line Items" table is related to the "Orders" table based on an "Order ID," and the "Order Line Items" table is related to the "Time" table based on ship date. Not all three of the relationships are fully active, wherein active relationships are represented by solid lines and inactive relationships are represented with dashed lines.

If activating (invoking USERELATIONSHIP) the relationship between "Order Line Items" and "Time," an ambiguous path is created such that a filter on "Time" could filter "Order Line Items" either via "Orders" or by way of the newly active relationship.

This ambiguity can be resolved by implementing a system of "weights" for each relationship. By assigning weighted priorities to relationships, the author's intent can be fulfilled by using the relationship invoked by USERELATIONSHIP. In one implementation, each relationship begins with a weight of one if that relationship is active and a weight of zero if that relationship is inactive. When USERELATIONSHIP is invoked at the topmost level, then the relationships referenced are assigned a weight of two. If there are nested invocations, then the next inner layer of nesting will assign a weight of four. In other words, each additional layer of nesting receives a greater assigned weight to the specified relationships.

When there are ambiguous paths, the weights of the relationships across that path are combined (e.g., using logical OR) to determine a weighting for the path. In one instance, the higher weighting is the path used in the calculation. In other words, the most recent (innermost) invocation of USERELATIONSHIP has a higher priority than other paths, resulting in the experience the user expects.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 5:
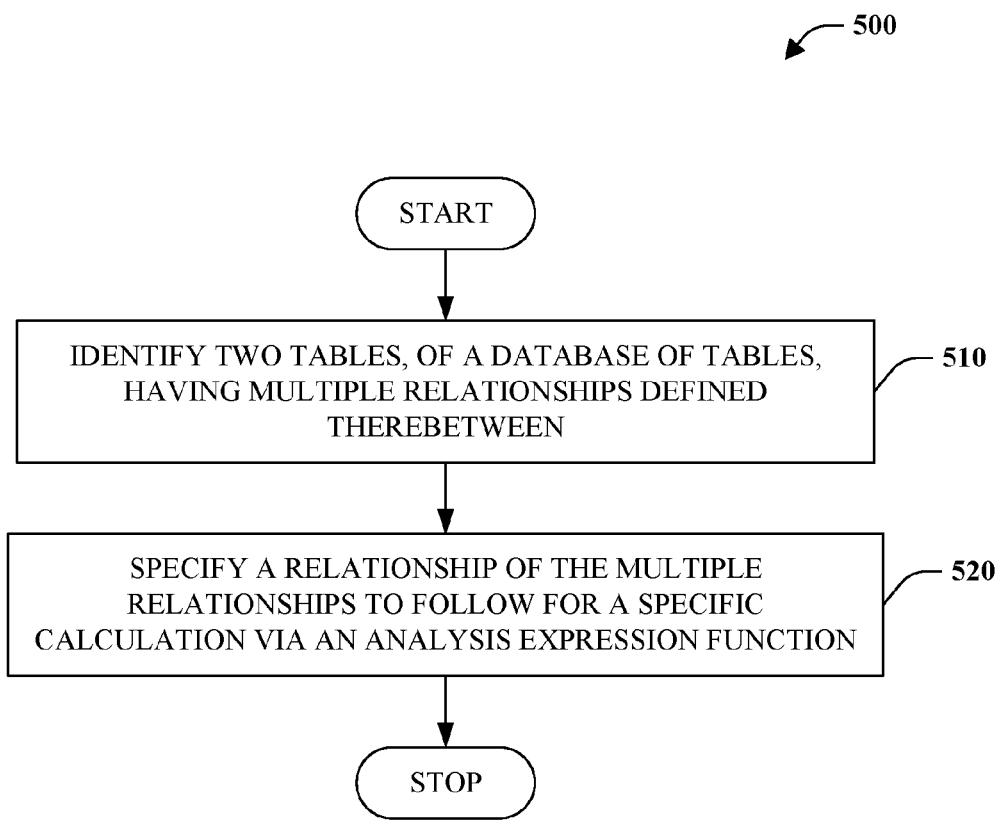
FIG. 5 illustrates a method that facilitates relationship selection in multi-relationship tables.
Figure 6:
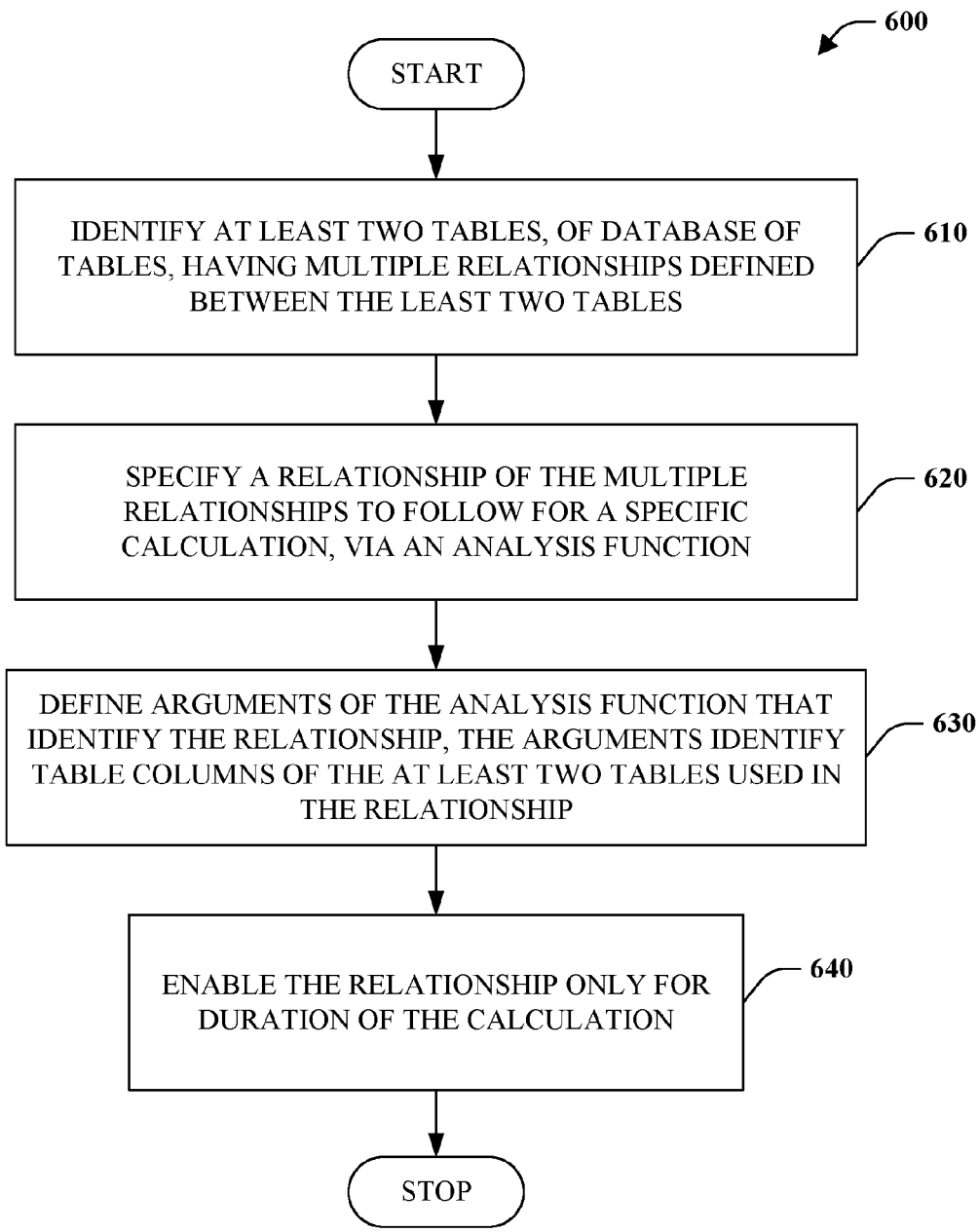
FIG. 6 depicts an alternative method that facilitates relationship selection in multi-relationship database tables.

In view of the exemplary systems described supra, methodologies that may be implemented in accordance with the disclosed subject matter will be better appreciated with reference to the flow charts of FIGS. 5-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 5, a method 500 is illustrated that facilitates relationship selection in multi-relationship tables. At reference numeral 510, two tables, of a database of tables, are identified as having multiple relationships defined therebetween. At reference numeral 520, a relationship of the multiple relationships is specified to follow for a specific calculation by way of an analysis expression function.

FIG. 6 depicts an alternative method 600 that facilitates relationship selection with respect to multi-relationship database tables. At reference numeral 610, at least two tables, of database of tables, are identified that have multiple relationships defined between the least two tables. At 620, a relationship of the multiple relationships is specified to follow for a specific calculation, via an analysis function. At 630, arguments of the analysis function are defined that identify the relationship. The arguments identify table columns of the at least two tables used in the relationship. At 640, the relationship is enabled solely for duration of the calculation.

As used herein, the terms "component," "system," "engine," as well as forms thereof (e.g., components, sub-components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
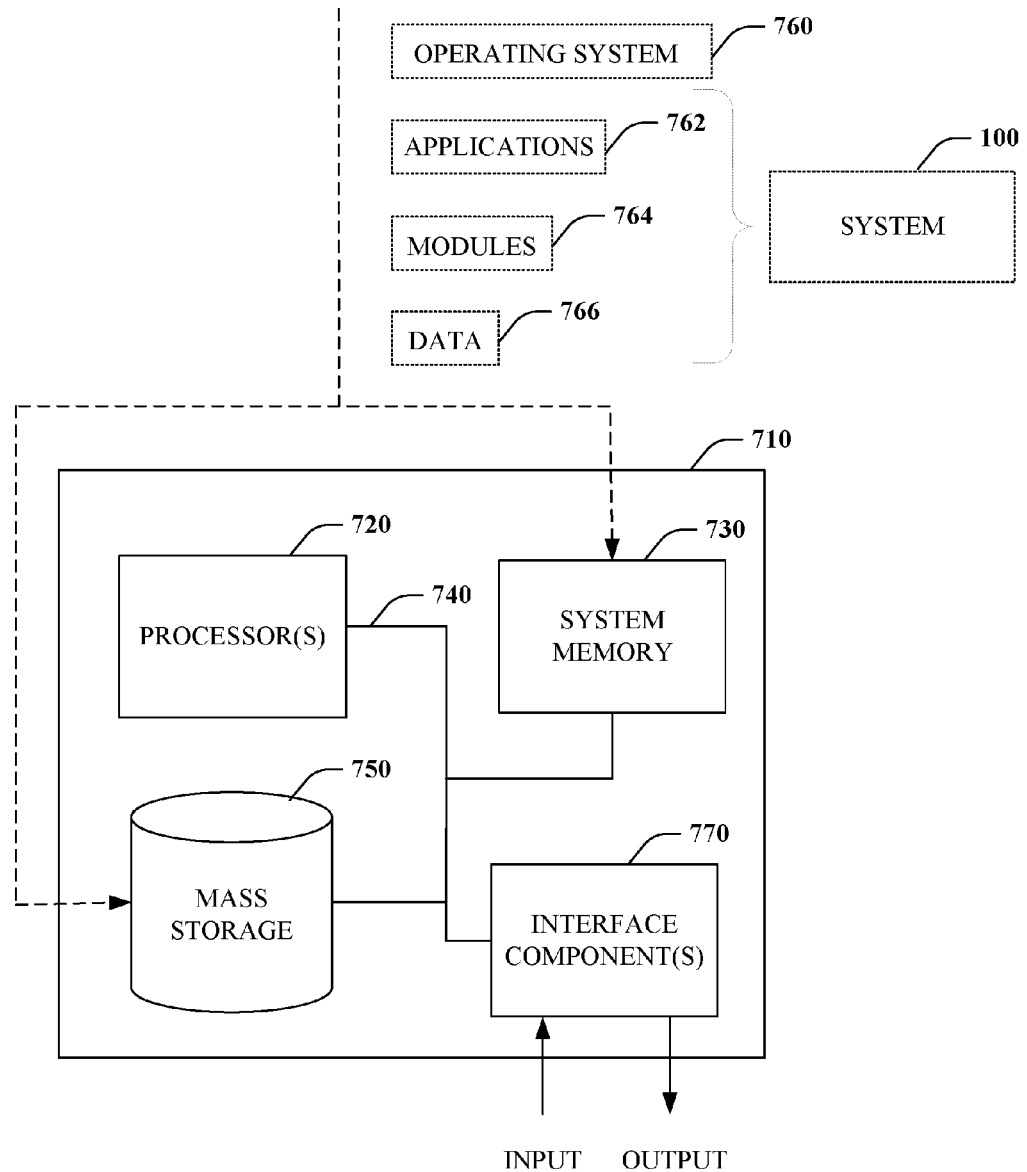
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710, or computing device, (e.g., desktop, laptop, server, hand-held, programmable consumer or industrial electronics, set-top box, game system . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766.

The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, the system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g. serial, parallel, PCMCIA, USB, Fire Wire . . . ) or an interface card (e.g., sound, video . . . ) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a system comprising at least one processor coupled to a memory storing machine-executable instructions, which, when executed by the processor, controls the system to perform acts, comprising:
   receiving a data analysis expression comprising a calculation and a relationship to use for the calculation from multiple relationships between data of two tables of a database;
   overriding a default relationship of the database with the relationship by setting the relationship as active and other relationships of the multiple relationships as inactive;
   retrieving data from the two tables for the calculation based on the active relationship;
   initiating execution of the calculation on the data, wherein execution of the calculation comprises evaluating an expression specified by the calculation on the data retrieved from the two tables;
   restoring the default relationship after execution of the calculation is complete by setting the default relationship as active and other relationships of the multiple relationships as inactive; and
   returning a result of execution of the calculation.

2. The method of claim 1 further comprises receiving a function as part of the data analysis expression that includes arguments that identify the relationship.

3. The method of claim 2 further comprises overriding the default relationship setting of the database with an innermost invocation of nested invocations of the function.

4. The method of claim 2 further comprises invoking the function multiple times to specify the multiple relationships.

5. The method of claim 1 further comprises assigning weighted priorities to the multiple relationships and calculating a path weight based on the priorities.

6. The method of claim 1 further comprises receiving a function as part of the data analysis expression that specifies the relationship as a first name of an existing column in a first table and a second name of an existing column in a second table.

7. The method of claim 1 further comprises initiating the execution of the calculation in response to evaluation of a query that invokes the calculation.

8. A system, comprising:
   a processor coupled to a memory, the processor configured to execute computer-executable instructions stored in the memory that when executed, perform the following acts:
   receive a data analysis expression comprising a calculation and a relationship, from multiple relationships between data of two tables of a database, to employ with respect to the calculation;
   override a default relationship of the database with the relationship by setting the default relationship as active and other relationships of the multiple relationships as inactive;
   retrieve data from the two tables for the calculation based on the active relationship, wherein the active relationship enables acquisition of data based on a particular column of matching data in the two tables;
   initiate execution of the calculation on the data, wherein execution of the calculation comprises evaluating an expression specified by the calculation on the data retrieved from the two tables;
   restore the default relationship after execution of the calculation is complete by setting the default relationship as active and other relationships of the multiple relationships as inactive; and return a result of execution of the calculation.

9. The system of claim 8, the relationship is specified by a function in which function arguments represent two endpoints of the relationship.

10. The system of claim 8, the multiple relationships are assigned weighted priorities and an ambiguity is resolved based on the weighted priorities.

11. The system of claim 8, the relationship includes a first name of an existing column in a first table and a second name of an existing column in a second table.

12. The system of claim 11, the relationship is one-to-many, wherein the first name of an existing column in the first table represents a many side of the relationship and the second name of an existing column in the second table represents a one side of the relationship.

13. The system of claim 8, the calculation is a function that takes the relationship as a filter.

14. The system of claim 8, execution of the calculation is initiated in response to evaluation of a query that invokes the calculation.

15. A computer-readable storage medium having instructions stored thereon that enable at least one processor to perform a method upon execution of the instructions, the method comprising:

receiving a data analysis expression comprising a calculation and an explicit relationship from multiple relationships between data of two tables of a database to employ with respect to the calculation;

overriding a default relationship setting of the database with the explicit relationship by setting the explicit relationship as active and other relationships of the multiple relationships as inactive;

retrieving data from the two tables for the calculation based on the active relationship, wherein the active relationship enables acquisition of data based on a particular column of matching data in the two tables;

initiating execution of the calculation on the data, wherein execution of the calculation comprises evaluating an expression specified by the calculation on the data retrieved from the two tables; and restoring the default relationship after execution of the calculation is complete by setting the default relationship as active and other relationships of the multiple relationships as inactive; and returning a result of execution of the calculation.

16. The computer-readable storage medium of claim 15, the method further comprises initiating the execution of the calculation in response to evaluation of a query that employs the calculation.

17. The computer-readable storage medium of claim 15, the method further comprises employing an innermost explicit relationship for nested data analysis expressions.

18. The computer-readable storage medium of claim 15, the method further comprises identifying the explicit relationship from arguments of a data expression function, wherein the arguments are a first name of an existing column in a first table and a second name of a column in a second table.

19. The method of claim 1, returning the result comprises returning a computed aggregate measure.

20. The system of claim 8, the result comprises a computed aggregate measure.

* * * * *